Figure 1:
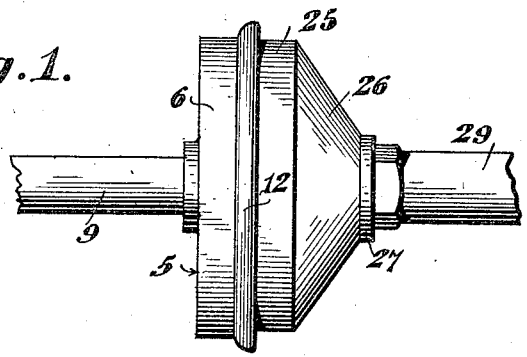

May 1, 1923.                                          1,453,912
McKIM C. BUCKLEY ET AL
FUEL MIXER
Filed Sept. 7, 1922

McKim C. Buckley  INVENTORS,
Harry Kendrick,
BY
Geo. S. Kimmel
ATTORNEY.

Patented May 1, 1923.

1,453,912

UNITED STATES PATENT OFFICE.

McKIM C. BUCKLEY AND HARRY KENDRICK, OF FRANKLIN, PENNSYLVANIA.

FUEL MIXER.

Application filed September 7, 1922. Serial No. 586,718.

*To all whom it may concern:*

Be it known that we, McKim C. Buckley and Harry Kendrick, citizens of the United States, residing at Franklin, in the county of Venango and State of Pennsylvania, have invented certain new and useful Improvements in Fuel Mixers, of which the following is a specification.

This invention relates to an air intake device for carbureters of motor vehicles, and has for its object to provide a device of such class, in a manner as hereinafter set forth, with means for supplying auxiliary air to the engine, preferably hot air, for increasing the efficiency of the combustible charge supplied to the engine cylinder, as well as, further providing for a considerable saving in gas consumption, at the same time ensuring an increased mileage with respect to a predetermined amount of gasoline and furthermore to cause a reduction of the carbon deposits on the piston and cylinder head, and although the device is designed primarily for use in connection with the carbureters of motor vehicles, being attached to the gas or air supply of the latter, yet it is to be understood that the device can be employed for any purposes wherein it is found applicable.

A further object of the invention is to provide an air intake device, in a manner as hereinafter set forth, with means for controlling the air supply when the engine is operating at high, low or intermediate speed.

Further objects of the invention are to provide an air intake device which is simple in its construction and arrangement, strong, durable, compact, small, efficient in its use, readily set up with respect to the carbureter, and inexpensive to manufacture.

With the foregoing and other objects in view, the invention consists of the novel construction, combination and arrangement of parts as hereinafter more specifically described and illustrated in the accompanying drawings wherein is shown an embodiment of the invention, but it is to be understood that changes, variations and modifications, can be resorted to which come within the scope of the claims hereunto appended.

In the drawings wherein like reference characters denote corresponding parts throughout the several views:—

Figure 2:
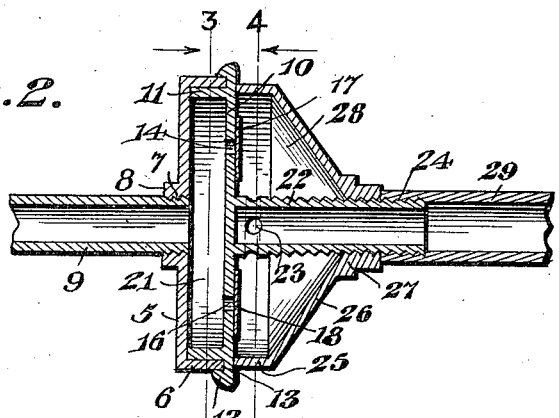
Figure 3:
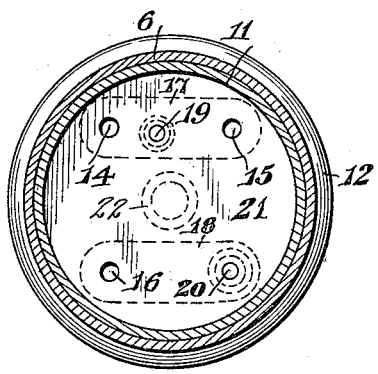
Figure 4:
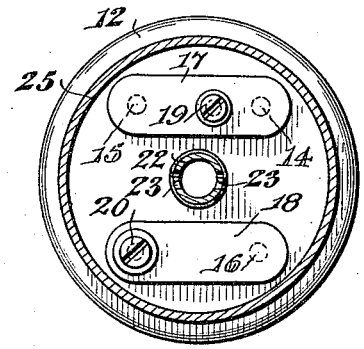

Figure 1 is a side elevation of an air intake device in accordance with this invention, Figure 2 is a longitudinal sectional view thereof, Figure 3 is a section on line 3—3, Figure 2, Figure 4 is a section on line 4—4, Figure 2.

An air intake device, in accordance with this invention, preferably is adapted to communicate with a source of hot air supply, and in this connection, any form of air heating receptacle, can be mounted on the exhaust manifold of the engine and to said heating device the air intake will be arranged to communicate, or when used in connection with an internal combustion engine of the stationary type, the air intake device can be arranged to communicate with any suitable construction of air heater. It will furthermore be stated, that the air intake device, can be arranged to communicate with the air supply element or the gas supply element of a carbureter, or may be so set up as to communicate with the intake manifold of the engine, at a point between the cylinder thereof and the carbureter.

Referring to the drawings in detail, 5 denotes an annular cup-shaped member having the side thereof indicated at 6. The member 5, centrally thereof, is formed with an opening 7, having the wall thereof threaded, and said member 5, on its outer face, is provided with a boss 8, which forms a continuation of the wall of the opening 7. The boss 8, is interiorly threaded. Threadably engaging with the boss 8, and the wall of the opening 7, is an air supply pipe 9, which leads from a suitable source of air supply, and preferably a source of hot air supply.

Arranged in telescopic relation with respect to the cup-shaped member 5, is a cup-shaped element 10, having the side thereof indicated at 11, and which extends into the cup-shaped member 5, and is surrounded and abutted by the side 6, of the said member 5. The side 6, of the member 5, abuts against the element 10, as is clearly shown in Figure 2. The element 10 is of greater diameter than the member 5, and is formed with a rearwardly extending peripheral flange 12, which provides in connection with the side 11, an annular groove or seat, and into which extends the side 6, of the member 5.

The element 10, is formed with a pair of aligning openings 14, 15, eccentrically disposed with respect to the axle of said element 10, and each arranged in proximity to the edge of the element 10, and the latter is furthermore provided with an opening 16, eccentrically disposed with respect to the axle of the element 10, and arranged in alignment with the opening 14.

Arranged against the forward face of the element 10, is a pair of reeds 17, 18, and the former is employed for controlling, with respect to the openings 14, 15, the air supply with respect to the lower and intermediate speeds, and the reed 18, in connection with the opening 16, is employed for controlling the air supply with respect to high speed; each of the reeds is of very thin material, and the reed 18, preferably 10-1000ths of an inch, and the reed 17, is secured eccentrically, as at 19, to the element 10, and secured in such a manner, that the securing device therefor will be to one side of the center and between the center and that end of the reed which extends over the opening 14, but under such circumstances, that portion of the reed 17, which projects from the securing device 19, toward the opening 15, would be weaker or more resilient than the other side portion of said reed. By this arrangement the supply of air is controlled with respect to the engine when operating at low and at intermediate speed. The reed 18 is secured to one end, as at 20, to the element 10 and extends over the opening 16.

The member 5 and element 10, are arranged in such relation with respect to each other to provide an air chamber 21, and the element has projecting forwardly from its outer face, a discharge pipe 22, the latter is positioned centrally with respect to the element 10, and is formed in close proximity to its rear terminus with a pair of inlet openings 23, and said pipe 22, is peripherally threaded as at 24.

Mounted against the forward face of the element 10, as well as surrounding the pipe 22, is an annular hollow member 25, provided with a forwardly projecting tapering extension 26, apertured at its center and provided with a centrally disposed interiorly threaded collar 27, for engagement with the peripheral threads 24, of the pipe 22. When the member 25, is mounted in operative position, it abuts against the forward face of the element 11, and in connection with said element 11, provides an air chamber 28. The length of the pipe 22, is such that it will project forwardly from the collar 27, and threadably engages with an air supply pipe 29, which leads to the carbureter or the intake manifold.

When the device is set up, the suction created from the motor, will shift an end of a reed and the air will pass from the chamber 21, through an opening in the element 10, into the chamber 28 through the inlets 23, into the pipe 22, and will be conducted by the pipe 29 to the carbureter. If the engine or motor is operated at high speed, the free end of the reed 18 will be shifted from closed position with respect to the opening 16, and communication will be established between the chambers 21 and 28, by the opening 16. If the engine or motor is operated at intermediate speed, that end of the reed 17 closing the opening 15, will be shifted therefrom, so that communication will be established between the chambers 21 and 28 through the opening 15, and if the engine or motor is operating at low speed, that end of the reed 17, which closes the opening 14, will be shifted therefrom, whereby communication is established between the chambers 21, 28, through the opening 14.

The member 5, is secured to the element 10, in any suitable manner, welded, brazed or soldered therewith, and in connection with the groove 13, which provides what may be termed a ground seat, an air-tight fit is provided.

The radii of the openings 14, 15 and 16, equal when all are open, the radius of the passage formed by the pipe 22.

From the foregoing description, taken in connection with the accompanying drawings, an air intake device is set up and which is operated automatically during the operation of the motor or engine, and is furthermore so set up, that the supply of air is controlled with respect to the speed of the engine, that is low, intermediate and high speed, and by this arrangement, the air supply is such as to obtain efficient results, and it will be furthermore understood, that the invention is not limited to the specific detail set forth, but that changes and variations can be made which will fall within the scope of the invention.

What we claim is:—

1. An air intake device for the purpose set forth comprising means to provide a pair of air chambers communicating with each other and having the points of communication normally closed, and a pair of suction operated elements for controlling communication between said chambers, one of said elements operated from each end thereof and the other of said elements operated from one end thereof.

2. An air intake device for the purpose set forth comprising means to provide a pair of air chambers communicating with each other and having the points of communication normally closed, a pair of suction operated elements for controlling communication between said chambers, one of said elements operated from each end thereof and the other of said elements operated from one end thereof, and an air supply pipe leading to one of said chambers and a ported air discharge pipe leading from the other of said chambers.

3. An air intake device for the purpose set forth comprising means to provide a pair of air chambers, said means provided with a pair of openings and a single opening for establishing communication between said chambers and with said openings normally closed, a suction operated element carried by said means for controlling said pair of openings, and a suction operated element carried by said means for controlling said single opening.

4. An air intake device for the purpose set forth comprising means to provide a pair of air chambers said means provided with a pair of openings and a single opening for establishing communication between said chambers and with said openings normally closed, a suction operated element carried by said means for controlling said pair of openings, a suction operated element carried by said means for controlling said single opening, means whereby that element for controlling said pair of openings is operated from either end thereof, and means whereby that element controlling said single opening is operated from one end thereof.

5. An air intake device for the purpose set forth comprising means to provide a pair of air chambers, said means provided with a pair of openings and a single opening for establishing communication between said chambers and with said openings normally closed, a suction operated element carried by said means for controlling said pair of openings, a suction operated element carried by said means for controlling said single opening, means whereby that element for controlling said pair of openings is operated from either end thereof, means whereby that element controlling said single opening is operated from one end thereof, an air supply pipe leading to one of said chambers, and a ported air discharge pipe leading from the other of said chambers.

6. An air intake device for the purpose set forth comprising means to provide a pair of air chambers and a pair of openings and a single opening for establishing communication between said chambers and normally closed, a suction operated element carried by said means for controlling said pair of openings, a suction operated element carried by said means for controlling said single opening, means whereby that element for controlling said pair of openings is operated from either end, means whereby that element controlling said single opening is operated from one end, an air supply pipe leading to one of said chambers, a ported air discharge pipe leading from the other of said chambers, and the ports in said air discharge pipe arranged in proximity to the inner end thereof.

In testimony whereof, we affix our signatures hereto.

McKIM C. BUCKLEY.
HARRY KENDRICK.